Jan. 6, 1942.    S. M. UDALE    2,269,294
POWER CONTROL
Filed March 3, 1939    2 Sheets-Sheet 1

Stanley M. Udale
INVENTOR.

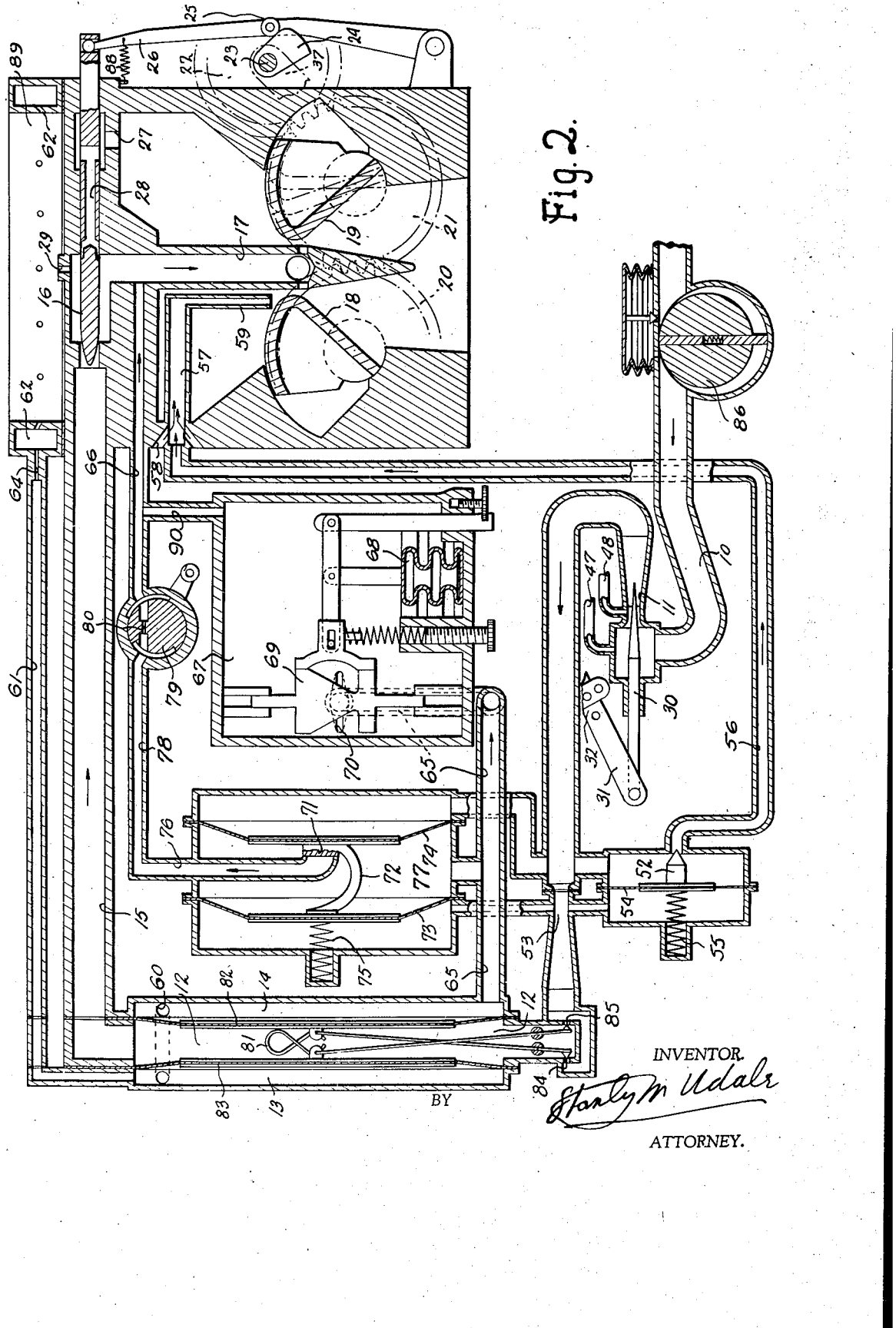

Patented Jan. 6, 1942

2,269,294

UNITED STATES PATENT OFFICE 2,269,294

POWER CONTROL

Stanley M. Udale, Detroit, Mich., assignor to George M. Holley and Earl Holley

Application March 3, 1939, Serial No. 259,493

7 Claims. (Cl. 261—51)

The object of this invention is to control the power of an airplane engine by means of a limitation to the quantity of fuel that the engine consumes. By this means every position of the power control establishes a maximum fuel consumption for that position of the power control. If the mixture ratio is constant regardless of variations in pitch of propeller or of altitude, the rate of fuel flow is a measure of the rate of air flow, and hence is a measure of power development.

I have discovered that a governor responsive to the rate of flow of fuel could be used to control the rate of flow of air, and hence the power developed. I further discovered that if I controlled the governor manually, then at any given position of the control of the fuel there will be a corresponding rate of air flow and hence a corresponding power developed. By this means, a power control is available for controlling an airplane engine.

In the drawings:

Figure 2 shows the relation of the fuel control to the means for maintaining the mixture ratio constant through variations in altitude and propeller pitch.

Figure 1:
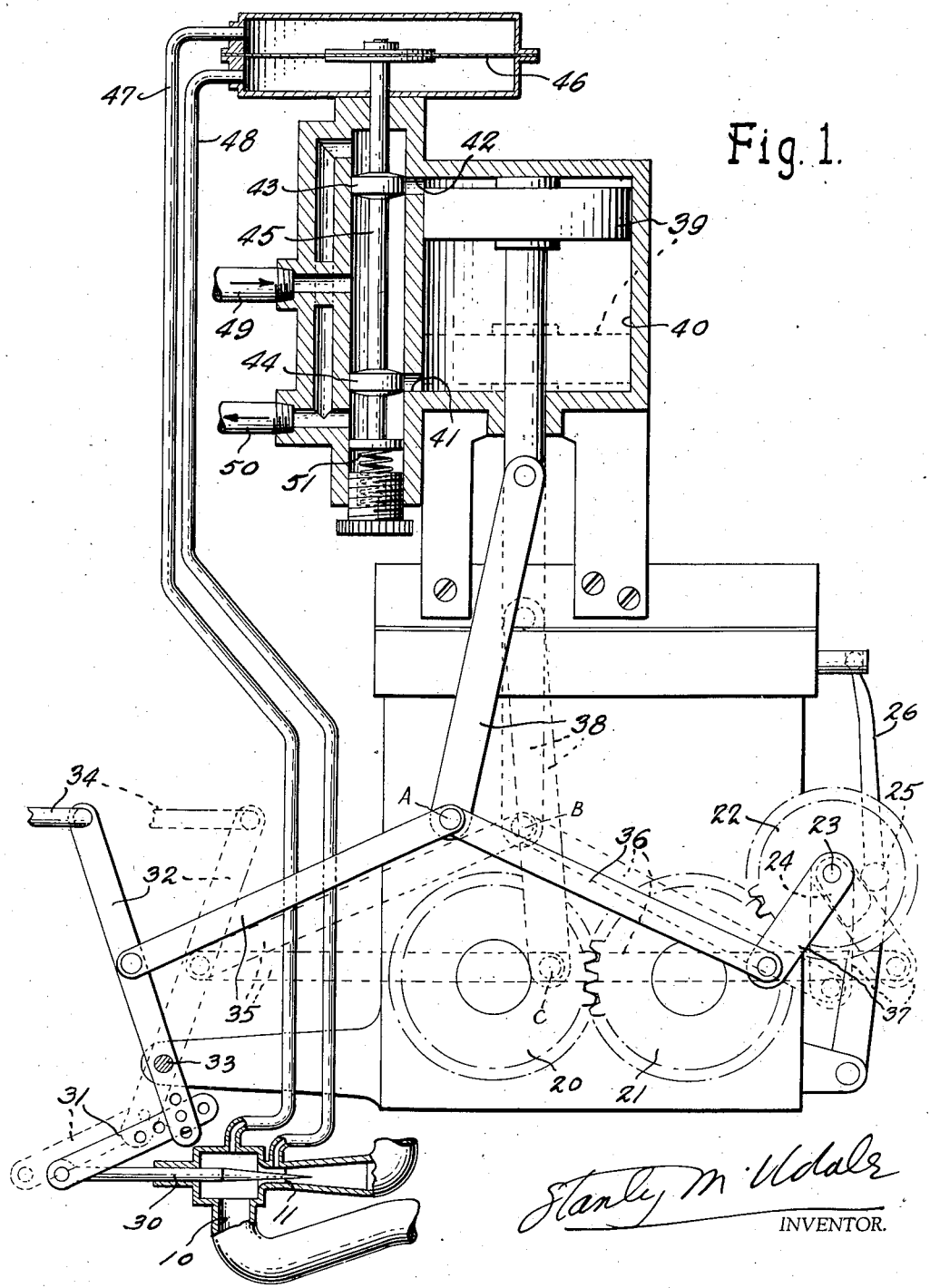
Figure 1 shows my invention applied to a throttle controlled carburetor in which a servo motor is shown, so that this device may overcome the friction of the carburetor throttles.

In Figures 1 and 2, 10 is the fuel entrance, fuel being supplied under a constant pressure from a mechanically driven pump 86. The fuel flows from 10 through a venturi 11, through a second venturi 53, and so to a diaphragm chamber 12. This diaphragm chamber has on each side of it an air chamber 13 and 14 which control the pressure inside the diaphragm chamber 12, which pressure is also controlled by the spring 81 which draws the two diaphragms 82 and 83 together and thus causes the two fuel needle valves 84 and 85 to seat and shut off the fuel flow from the fuel pump 86 to the fuel chamber 12.

The fuel flows from the diaphragm chamber 12 along the passage 15, past the needle valve 16, to an air and fuel nozzle passage 17, which discharges freely into the throat formed between the two throttles 18 and 19. This forms a variable venturi. These throttles are geared together by gears 20 and 21.

The gear 21 is operated by a gear 22 mounted on a shaft 23 which is operated by the throttle control lever 37. Hence, as the throttle control lever 37 is rotated anti-clockwise, the two throttles 18 and 19 open and the needle 16 moves to the right, allowing fuel to pass from the passage 15 into the nozzle passage 17.

The cam 24 mounted on the shaft 23 operates a cam follower 25 mounted on the lever 26 which is connected to the needle valve 16 so that the throttles and needle valve move in unison as described above. A spring 88 holds the cam follower 25 in engagement with the cam 24.

The air entrance 27 admits air for idling from the main air entrance 89 to the central passage 28 formed in the needle valve 16 which acts as an air valve. When the needle valve is closed the air flows from the passage 28 to the nozzle passage 17. When the throttle is opened, this passage 28 is disconnected from the nozzle passage 17. Air is admitted to the passage 17 at all times through a fixed opening 29.

Automatic fuel control means are also provided whereby the pressure, or rather, the suction in the chambers 13 and 14, is varied so as to vary the head of fuel flowing past the needle 16. These means are briefly as follows:

A passage 60 connects the two chambers 13 and 14 together. A passage 61 connects both the chambers 13 and 14 to the vent ring 62 in the air entrance 89 of the carburetor. A restriction 64 limits the amount of air that can flow from the vent ring 62 into the chambers 13 and 14. On the lower side of the chamber 14, a passage 65 is provided connected by two paths to the nozzle passage 17.

The first path is through the chamber 67 which is connected to the passage 66 through a passage 90 which communicates freely with the passage 17. In this chamber 67 is located an aneroid bellows 68 which controls the valve 69 which in its turn controls the area of a slot 70 which communicates with the passage 65. Hence, when the depression in 17 increases either because of an increased fuel flow due to an increase in engine revolutions caused by a reduction in propeller pitch, or due to the fact that the plane climbs to a higher altitude, then the slot 70 increases in area and a bigger suction is applied to the diaphragms forming the diaphragm chamber 12. Hence, the area of the slot 70 and the relative area of the restriction 64 determines the pressure in the chambers 13 and 14. In addition to this, a manually controlled valve 79 is provided which applies additional suction to the chambers 13 and 14.

In the position shown, a restriction 80 applies nozzle suction to the two chambers 14 and 13, being connected through the passage 78 with the chamber 77. This suction is communicated to the passage 76 which communicates with the passage 65. Obviously the valve 79 may be rotated so as to render the restriction 80 ineffective. In the position shown, however, the restriction 80 is effective until the flow through the fuel venturi 53 reaches a predetermined value when the depression in the throat of the venturi 53 acting on the diaphragm 73 causes the diaphragm 73 to move to the left and the pressure of the fuel acting on the diaphragm 74 assists the diaphragm 73 in compressing the spring 75 carrying with it the bridge 72 which carries the valve 71 which closes the air exit through the passage 76. The diaphragm 74 responds to the pressure of the fuel in the entrance to the venturi 53. Hence the pressure drop in the venturi 53 is the operating means which operates the valve 71 and when the value of the flow through 53 reaches a predetermined value set by the stiffness of the spring 75, the valve 71 closes the entrance to the passage 76 and thus the orifice 80 immediately becomes inoperative and the mixture ratio immediately becomes richer. At the same time, the fuel flowing through 53 causes the needle valve 52 to move to the left, the chamber 54 being subjected to the suction in the throat of the venturi 53, the needle valve 52 moves to the left compressing the spring 55 and admitting fuel from the entrance to the venturi 53 to the passage 56. The fuel passage 56 is freely vented to the atmosphere through the openings 58, and discharges through 57 into the outlet 59 in the throat of the venturi formed between the two throttles 18 and 19.

The control of the carburetor is determined by the opening and closing of the throttles 18 and 19. It is also controlled by the movement of the needle 30 in the throat of the venturi 11, which is controlled by the link 31 connected to the link 32, which is mounted on the fixed fulcrum 33 and is operated by a throttle controlled link 34, Figure 1.

The passage 47 connects the entrance of the throat of the venturi 11 to the servo mechanism shown in the upper left hand corner of Figure 1. The pipe 48 connects this mechanism with the depression in the throat of the venturi 11. When the flow at any throttle position exceeds a certain value, the diaphragm 46 is moved against the pressure of the spring 51. This diaphragm 46 carries the valve rod 45 which controls the servo mechanism. The valves 43 and 44 control the passages 41 and 42, and when an excessive amount of fuel is taken at any given throttle position through the venturi 11, the diaphragm 46 moves down and with it the valve rod 45, responsive to the pressure differential in the venturi 11. This motion admits oil pressure from the passage 49 to the underside of the piston 39 in the cylinder 40. This lifts the piston 39 and carries with it the link 38. This link 38 is connected to the toggle consisting of the broken links 35, 36, which make the broken link connection between the manually operated throttle lever 32 and the automatically operated throttle lever 37. Hence it follows that the throttle will be automatically closed when the fuel exceeds the flow determined by the position of the throttle lever 32 and of the needle 30 in the throat of the venturi 11. The position of the needle 30 with reference to the throttle lever 32 is determined by the link 31 which may be connected in different positions to the lever 32.

The lever 32 is shown in two positions. The position shown in full lines corresponds to the idling position and the open throttle position is shown by broken lines. In the latter position the throttle lever 37 connected to the throttles 18, 19 through the gearing is shown in two positions, both positions being shown in broken lines. In the first the throttles are half open corresponding to the reduced charge which is absolutely necessary when near the sea level to prevent the wrecking of the engine by excessive power. In the other position the throttles are wide open and the broken links of the toggle 35, 36 are shown in line with each other, so that the throttles are opened wide enough to permit the engine to obtain the maximum amount of air available, which is a necessary condition at all altitudes above say 10,000 feet.

The location of the pin uniting the three links 35, 36 and 37 is marked A when the manually controlled throttle lever 32 is closed and the throttles are closed. It is marked B in the second location when the manually controlled throttle lever 32 is open and the throttles are only half opened which corresponds to maximum power near the ground. The third location is marked C when the manually controlled throttle lever 32 and the throttles are both wide open, which is the position they assume when maximum power is desired at altitude.

*Operation*

Considering the carburetors shown in Figures 1 and 2, when the throttle is in any given position, the area of the throat of the venturi 11 is determined by the position of the needle 30. When the velocity of the fuel flow through 11 past the needle 30 reaches the figure determined by the spring 51 in Figure 2, the diaphragm 46 descends and the valve 44 admits oil from the oil pipe 49 to the under side of the piston 39 and thus the link 38 is raised and the broken link, 35, 36 moves to the position shown in full lines, and thereby the throttle control lever 37 is moved clockwise so as to close the throttles and reduce the fuel and air flow. When the velocity of fuel flow falls below the velocity which creates the pressure difference determined by the spring 51, the reverse action takes place and the piston 39 descends, the broken link 35, 36 straightens out, the throttle lever 37 rotates anti-clockwise into the position shown in Figure 1 in broken lines. Thereupon the gear 22 engages with the throttle gears 20, 21 and the throttle 19 is moved in the clockwise direction, the throttle 18 in the anti-clockwise direction and the needle 16 is moved to the right until the fuel flow and the air flow increase and a balance is once more established.

The quantity of fuel flow for any given position of the throttle is therefore determined by the critical velocity through the venturi 11 multiplied by the area between the tapered needle 30 and the throat of the venturi 11. By this means, every position of the throttle lever 32 corresponds to some definite maximum fuel flow, and therefore the maximum horsepower is maintained substantially constant at every position of the throttle lever 32.

What I claim is:

1. In a carburetor having a mixing chamber, a fuel supply means discharging therein, a mixture outlet, a throttle valve therein, a throttle lever connected thereto, a manually controlled throttle operating lever, a toggle connecting the two levers together, automatic means for regulating the fuel and air ratio, a variable fuel restriction, control means therefor interconnected with said manually controlled throttle operating lever, means responsive to the pressure difference across said variable fuel restriction adapted to break the toggle when the fuel flow exceeds a predetermined flow, whereby the throttle lever is moved to the partially closed position, the manually controlled throttle operating lever remaining unmoved whenever the fuel flow exceeds the critical fuel flow determined by the variable orifice.

2. In a carburetor having a mixture chamber, a fuel supply means discharging therein, a mixture outlet, a throttle valve therein, a throttle lever connected thereto, a manually controlled throttle operating lever, a toggle connecting the two levers together, automatic means for regulating the fuel and air ratio, a restricted fuel passage, a movable restriction therein, a connection from said movable restriction to said manually controlled throttle operating lever adapted to open the restricted fuel passage as the throttle is opened, means responsive to the velocity of flow through said restricted fuel passage adapted to break the toggle connection whenever the flow through said fuel restriction exceeds a predetermined value, whereby the throttle lever is moved to the partially closed position, the manually controlled throttle operating lever remaining unmoved.

3. A power governor for an internal combustion engine comprising a restricted fuel passageway, a restricted air passageway, throttle means for the air passageway, automatic means responsive to the rate of air flow through said restricted air passage for controlling the fuel flow, means directly responsive to the fuel flow through said restricted fuel passage operatively connected to said throttle valve for restricting and restricting to a like degree the flow of both fuel and air to the engine when the fuel flow to the engine exceeds a predetermined maximum.

4. A power governor for an internal combustion engine comprising a carburetor, a mixture chamber, a throttle valve therefor, a fuel supply comprising a restricted fuel passageway, means responsive to the air flow to said engine for regulating said fuel supply, means directly responsive to the fuel flow through said restricted fuel passageway operatively connected to said throttle valve so as to limit the rate of air supply to a predetermined maximum corresponding to a predetermined maximum rate of fuel supply.

5. A power control for an internal combustion engine comprising a carburetor, a mixture chamber, an air entrance leading thereto, a fuel supply regulating means therefor responsive to the air flow, throttling means adapted to control the mixture supply, a restricted fuel passageway, means directly responsive to the velocity of said fuel supply through said restricted passage, and operatively connected to said throttle for limiting the mixture supply to a predetermined maximum.

6. A power governor for an internal combustion engine comprising a mixture chamber having an air supply and a fuel supply, throttling means adapted to control the mixture supply, two restricted passageways, one for the air and one for the fuel, means for regulating said fuel supply by the air flow through its restricted passageway so as to control the ratio of fuel to air, means directly responsive to the fuel flow through its restricted passageway, operatively connected to said throttling means for limiting the air flow to a predetermined maximum flow.

7. An automatic air and fuel flow throttling means for an internal combustion engine, having automatic means responsive to the rate of air flow and to air density for controlling the rate of fuel supply, a restricted passageway for said fuel flow, means operatively connected to said throttling means and directly responsive to the rate of fuel flow through said restricted passageway whereby the air and fuel flows are limited to predetermined maximum rates of flow.

STANLEY M. UDALE.